(12) United States Patent
Lee

(10) Patent No.: US 9,977,465 B2
(45) Date of Patent: May 22, 2018

(54) MOBILE TERMINAL CAPABLE OF CHANGING SHAPE IN RESPONSE TO AN EVENT

(71) Applicant: LG ELECTRONICS INC., Seoul (KR)

(72) Inventor: Minheui Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days. days.

(21) Appl. No.: 14/902,441

(22) PCT Filed: Nov. 5, 2013

(86) PCT No.: PCT/KR2013/009919
§ 371 (c)(1),
(2) Date: Dec. 31, 2015

(87) PCT Pub. No.: WO2015/002349
PCT Pub. Date: Jan. 8, 2015

(65) Prior Publication Data
US 2016/0147262 A1 May 26, 2016

(30) Foreign Application Priority Data
Jul. 2, 2013 (KR) .................. 10-2013-0076905

(51) Int. Cl.
*G06F 3/041* (2006.01)
*G06F 1/16* (2006.01)
(Continued)

(52) U.S. Cl.
CPC ........... *G06F 1/1652* (2013.01); *F03G 7/065* (2013.01); *G06F 1/1626* (2013.01);
(Continued)

(58) Field of Classification Search
None
See application file for complete search history.

(56) References Cited

U.S. PATENT DOCUMENTS 6,061,062 A * 5/2000 Venolia ................. G06F 3/0481
715/856
2008/0294984 A1 11/2008 Ramsay et al.
(Continued)

FOREIGN PATENT DOCUMENTS

EP 2150031 2/2010

OTHER PUBLICATIONS

PCT International Application No. PCT/KR2013/009919, Written Opinion of the International Searching Authority dated Mar. 19, 2014, 11 pages.
(Continued)

*Primary Examiner* — Ilana Spar
*Assistant Examiner* — Kirk Hermann
(74) *Attorney, Agent, or Firm* — Lee, Hong, Degerman, Kang & Waimey

(57) ABSTRACT

There is disclosed a mobile terminal including a body comprising a predetermined flexible portion, a display provided in the body to output image information and to receive an input touch gesture, a plurality of actuators provided in the body to change a shape of the body, and a controller controls the actuators in accordance with an operation condition set corresponding to the event, when an event is generated, wherein the operation condition comprises at least one of a driving actuator of which a shape is changed, a shape-variation level of the driving actuator, a shape-variation speed of the driving actuator and a shape-variation frequency of the driving actuator. The body of the mobile terminal includes the actuator to change the shape of the mobile terminal. Accordingly, the user can be informed of a
(Continued)

message by the shape variation of the mobile terminal, such that use convenience may be enhanced.

19 Claims, 12 Drawing Sheets

(51) Int. Cl.
  *G06F 3/01* (2006.01)
  *G06F 3/0482* (2013.01)
  *G06F 3/0484* (2013.01)
  *G06F 3/0488* (2013.01)
  *F03G 7/06* (2006.01)
  *G06F 3/0481* (2013.01)
(52) U.S. Cl.
  CPC .......... *G06F 1/1656* (2013.01); *G06F 1/1675* (2013.01); *G06F 3/016* (2013.01); *G06F 3/0482* (2013.01); *G06F 3/04817* (2013.01); *G06F 3/04842* (2013.01); *G06F 3/04845* (2013.01); *G06F 3/04847* (2013.01); *G06F 3/04883* (2013.01); *G06F 2203/014* (2013.01)

(56) References Cited

U.S. PATENT DOCUMENTS

| | | | | |
|---|---|---|---|---|
| 2008/0303782 | A1* | 12/2008 | Grant | G06F 1/1615 345/156 |
| 2009/0322498 | A1* | 12/2009 | Yun | G06F 3/016 340/407.2 |
| 2009/0325645 | A1* | 12/2009 | Bang | G06F 3/016 455/566 |
| 2010/0117954 | A1 | 5/2010 | Cohen et al. | |
| 2010/0117975 | A1* | 5/2010 | Cho | G06F 1/1626 345/173 |
| 2010/0188422 | A1* | 7/2010 | Shingai | G06F 3/016 345/647 |
| 2012/0032906 | A1* | 2/2012 | Lemmens | G06F 3/011 345/173 |
| 2012/0040711 | A1* | 2/2012 | Wong | H04M 1/72519 455/550.1 |
| 2013/0047121 | A1* | 2/2013 | Kao | G06F 9/44505 715/810 |
| 2013/0131887 | A1* | 5/2013 | Park | G05B 11/01 700/303 |
| 2013/0191775 | A1* | 7/2013 | Lawson | G06F 9/4443 715/784 |
| 2013/0265260 | A1* | 10/2013 | Seo | G06F 3/041 345/173 |
| 2014/0104244 | A1* | 4/2014 | Baldwin | G06F 1/1626 345/204 |
| 2014/0195906 | A1* | 7/2014 | Ramsay | G06F 1/1626 715/702 |

OTHER PUBLICATIONS

European Patent Application No. 13888661.9, Search Report dated Nov. 15, 2016, 11 pages.
Sciencentechnology1, "The shape changing mobile phone that curls up when you get a call and trembles when you get a text," published Apr. 29, 2013, 16 pages.

* cited by examiner

MOBILE TERMINAL CAPABLE OF CHANGING SHAPE IN RESPONSE TO AN EVENT

CROSS-REFERENCE TO RELATED APPLICATIONS

This application is the National Stage filing under 35 U.S.C. 371 of International Application No. PCT/KR2013/009919, filed on Nov. 5, 2013, which claims the benefit of earlier filing date and priority to Korean Application No. 10-2013-0076905, filed on Jul. 2, 2013, the contents of which are all hereby incorporated by reference herein in their entirety.

TECHNICAL FIELD

The present disclosure relates to a mobile terminal including a body which has an automatically changeable shape in response to an event, when an event is generated.

BACKGROUND ART

There exists conventional mobile terminals that can be hand carried and has one or more functions such as voice and video call communication, inputting and outputting information, storing data, and the like.

As such functions become more diversified, the mobile terminal can support more complicated functions such as capturing images or video, reproducing music or video files, playing games, receiving broadcast signals, and the like. By comprehensively and collectively implementing such functions, the mobile terminal may be embodied in the form of a multimedia player or device.

In addition, there are under development mobile terminals to which a double-sided liquid crystal display (LCD), a flexible display or a full touch screen is applied.

DISCLOSURE

Technical Problem

An object of the present disclosure is to provide a mobile terminal including a body which has an automatically changeable shape in response to an event, when an event is generated.

Technical Solution

To achieve these objects and other advantages and in accordance with the purpose of the invention, as embodied and broadly described herein, a mobile terminal includes a body comprising a predetermined flexible portion; a display provided in the body to output image information and to receive an input touch gesture; a plurality of actuators provided in the body to change a shape of the body; and a controller configured to control the actuators in accordance with an operation condition set corresponding to the event, when an event is generated, wherein the operation condition comprises at least one of a driving actuator of which a shape is changed, a shape-variation level of the driving actuator, a shape-variation speed of the driving actuator and a shape-variation frequency of the driving actuator.

The actuators may transform at least one of four corners and four sides in the mobile terminal.

The controller may provide a setting menu configured to set the operation condition of the actuators corresponding to the event.

The controller may control the display to output a message window for entering into the setting menu or a screen of the setting menu, when an event without the operation condition is generated.

The setting menu may include a first graphic user interface configured to select the event.

The setting menu may include a second graphic user interface configured to display the shape of the mobile terminal and the actuators, and the controller may select the driving actuator when a touch gesture is input to at least one of the actuators displayed on the second graphic user interface (GUI).

The controller may change a shape of the second graphic user interface (GUI) in accordance with a length of the drag gesture, when a drag gesture is input to the actuator selected from the second graphic user interface (GUI), and the controller may set the shape-variation level of the driving actuator in accordance with a shape-variation level of the second graphic user interface (GUI).

The setting menu may provide a third graphic user interface configured to set at least one of the angle of the driving actuator changed with respect to the body of the mobile terminal, the shape-variation speed of the driving actuator, the shape-variation frequency of the driving actuator numerically.

The setting menu may provide a third user interface configured to set a plurality of scenes implemented continuously, and an operation condition may be set for each of the scenes.

In case a shape-variation speed of the driving actuator is relatively fast and a shape-variation frequency of the driving actuator is relatively high, the controller may provide sounds or vibration by controlling the actuator in accordance with the operation condition when the event is generated.

The shape of the actuator may be changeable by an external force, and the controller may set the shape-variation level of the actuator as the operation condition, when the shape of the actuator is changed within a reference time period after the event is generated.

The mobile terminal may further include a plurality of temperature sensors, wherein the event is temperature change detected by the temperature sensors, and the controller controls an actuator near the temperature sensor which detects a temperature within a range of human temperatures when the event is generated.

The mobile terminal may further include a plurality of proximity sensors, wherein the event is detecting of an object approaching the proximity sensor, and the controller controls the actuator to be projected toward the object or to cover the object, when the event is generated.

The display may display a plurality of fourth user interfaces configured to implement applications, and the controller may change a shape of an actuator near a fourth user interface of an application associated with the event.

The event may include at least one of message receiving, call receiving, application update, battery recharging and sensor and sensor detecting.

Advantageous Effects

According to the embodiments of the present disclosure, the body of the mobile terminal includes the actuator to change the shape of the mobile terminal. Accordingly, the user can be informed of a message by the shape variation of the mobile terminal, rather than conventional sounds, vibration and screen displaying, such that use convenience may be enhanced.

Furthermore, when an event is generated, the mobile terminal may memorize the changed shape of the mobile terminal. The mobile terminal can be automatically transformed in a predetermined shape which allows the user to easily hold the mobile terminal in the hand or conveniently implements a specific work. Accordingly, use convenience may be enhanced.

Still further, the user can simply set a variable shape of the actuator in accordance with a use style of the mobile terminal different for each user. Accordingly, individual user control may be achieved.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

MODE FOR INVENTION

In the following detailed description, reference is made to the accompanying drawing figures which form a part hereof, and which show by way of illustration various embodiments.

As used herein, the suffixes 'module', 'unit' and 'part' are used for elements in order to facilitate the disclosure only. Therefore, significant meanings or roles are not given to the suffixes themselves and it is understood that the 'module', 'unit' and 'part' can be used together or interchangeably.

The various features described herein may be applicable to a various types of mobile terminals. Examples of such terminals may include mobile phones, user equipments, smart phones, digital broadcast receivers, personal digital assistants, laptop computers, portable multimedia players (PMP), navigators and the like.

Figure 1:
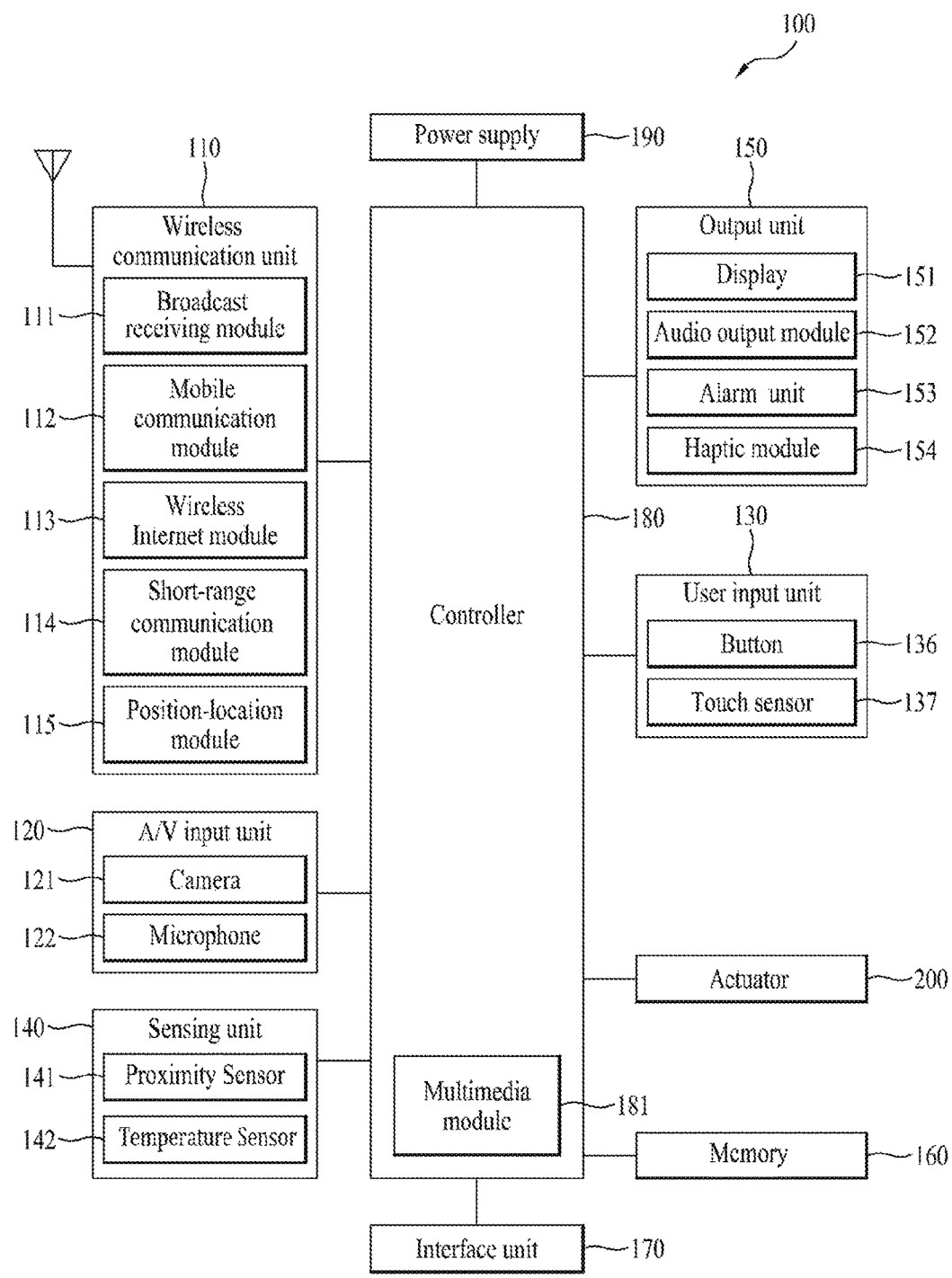
FIG. 1 is a block diagram of a mobile terminal according to one embodiment of the present disclosure.

FIG. 1 is a block diagram of a mobile terminal 100 in accordance with an embodiment as broadly described herein. The mobile terminal 100 may include a wireless communication unit 110, an A/V (audio/video) input unit 120, a user input unit 130, a sensing unit 140, an output unit 150, a memory 160, an interface unit 170, a controller 180, a power supply unit 190 and the like. FIG. 1 shows the mobile terminal 100 having various components, but it is understood that implementing all of the illustrated components is not a requirement. Greater or fewer components may alternatively be implemented.

In the following description, the above elements of the mobile terminal 100 are explained in sequence.

First of all, the wireless communication unit 110 typically includes one or more components which permits wireless communication between the mobile terminal 100 and a wireless communication system or network within which the mobile terminal 100 is located. For instance, the wireless communication unit 110 can include a broadcast receiving module 111, a mobile communication module 112, a wireless internet module 113, a short-range communication module 114, a position-location module 115 and the like.

The broadcast receiving module 111 receives a broadcast signal and/or broadcast associated information from an external broadcast managing server via a broadcast channel. The broadcast channel may include a satellite channel and a terrestrial channel. At least two broadcast receiving modules 111 can be provided to the mobile terminal 100 in pursuit of simultaneous receptions of at least two broadcast channels or broadcast channel switching facilitation.

The broadcast managing server generally refers to a server which generates and transmits a broadcast signal and/or broadcast associated information or a server which is provided with a previously generated broadcast signal and/or broadcast associated information and then transmits the provided signal or information to a terminal. The broadcast signal may be implemented as a TV broadcast signal, a radio broadcast signal, and a data broadcast signal, among others. If desired, the broadcast signal may further include a broadcast signal combined with a TV or radio broadcast signal.

The broadcast associated information includes information associated with a broadcast channel, a broadcast program, a broadcast service provider, etc. And, the broadcast associated information can be provided via a mobile communication network. In this case, the broadcast associated information can be received by the mobile communication module 112.

The broadcast associated information can be implemented in various forms. For instance, broadcast associated information may include an electronic program guide (EPG) of digital multimedia broadcasting (DMB) and electronic service guide (ESG) of digital video broadcast-handheld (DVB-H).

The broadcast receiving module 111 may be configured to receive broadcast signals transmitted from various types of broadcast systems. By nonlimiting example, such broadcasting systems include digital multimedia broadcasting-terrestrial (DMB-T), digital multimedia broadcasting-satellite (DMB-S), digital video broadcast-handheld (DVB-H), Convergence of Broadcasting and Mobile Service (DVB-CBMS), Open Mobile Alliance-BroadCAST (OMA-BCAST), China Multimedia Mobile Broadcasting (CMMB), Mobile Broadcasting Business Management System (MBBMS), the data broadcasting system known as media forward link only (MediaFLO®) and integrated services digital broadcast-terrestrial (ISDB-T). Optionally, the broadcast receiving module 111 can be configured suitable for other broadcasting systems as well as the above-explained digital broadcasting systems.

The broadcast signal and/or broadcast associated information received by the broadcast receiving module 111 may be stored in a suitable device, such as a memory 160.

The mobile communication module 112 transmits/receives wireless signals to/from one or more network entities (e.g., base station, external terminal, server, etc.) via a mobile network such as GSM (Gobal System for Mobile communications), CDMA (Code Division Multiple Access), WCDMA (Wideband CDMA) and so on. Such wireless signals may represent audio, video, and data according to text/multimedia message transmission and reception, among others.

The wireless internet module 113 supports Internet access for the mobile terminal 100. This module may be internally or externally coupled to the mobile terminal 100. In this case, the wireless Internet technology can include WLAN (Wireless LAN) (Wi-Fi), Wibro (Wireless broadband), Wimax (World Interoperability for Microwave Access), HSDPA (High Speed Downlink Packet Access), GSM, CDMA, WCDMA, LTE (Long Term Evolution) etc.

Wireless internet access by Wibro, HSPDA, GSM, CDMA, WCDMA, LTE or the like is achieved via a mobile communication network. In this aspect, the wireless internet module 113 configured to perform the wireless internet access via the mobile communication network can be understood as a sort of the mobile communication module 112.

The short-range communication module 114 facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

The position-location module 115 identifies or otherwise obtains the location of the mobile terminal 100. If desired, this module may be implemented with a global positioning system (GPS) module. According to the current technology, the GPS module 115 is able to precisely calculate current 3-dimensional position information based on at least one of longitude, latitude and altitude and direction (or orientation) by calculating distance information and precise time information from at least three satellites and then applying triangulation to the calculated information. Currently, location and time information are calculated using three satellites, and errors of the calculated location position and time information are then amended using another satellite. Besides, the GPS module 115 is able to calculate speed information by continuously calculating a real-time current location.

Referring to FIG. 1, the audio/video (A/V) input unit 120 may be configured to provide audio or video signal input to the mobile terminal 100. As shown, the NV input unit 120 includes a camera 121 and a microphone 122. The camera 121 receives and processes image frames of still pictures or video, which are obtained by an image sensor in a video call mode or a photographing mode. In addition, the processed image frames can be displayed on the display 151 of the output unit 150.

The image frames processed by the camera 121 can be stored in the memory 160 or can be externally transmitted via the wireless communication unit 110. Optionally, at least two cameras 121 can be provided to the mobile terminal 100 according to environment of usage.

The microphone 122 receives an external audio signal while the portable device is in a particular mode, such as phone call mode, recording mode and voice recognition. This audio signal is processed and converted into electric audio data. The processed audio data is transformed into a format transmittable to a mobile communication base station via the mobile communication module 112 in case of a call mode. The microphone 122 may include assorted noise removing algorithms to remove noise generated in the course of receiving the external audio signal.

The user input unit 130 may generate input data responsive to user manipulation of an associated input device or devices. Examples of such devices include a button 136 provided to front/rear/lateral side of the mobile terminal 100 and a touch sensor (pressure sensitive touch/capacitive touch) 137 and may further include a key pad, a dome switch, a jog wheel, a jog switch and the like.

The sensing unit 140 may provide sensing signals for controlling operations of the mobile terminal 100 using status measurements of various aspects of the mobile terminal 100. For instance, the sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation or acceleration/deceleration of the mobile terminal 100. By nonlimiting example, such a sensing unit 140 may include, a gyro sensor, an acceleration sensor, a geomagnetic sensor and the like.

As an example, consider the mobile terminal 100 being configured as a slide-type mobile terminal. In this configuration, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device.

Meanwhile, the sensing unit 140 may include a proximity sensor 141 configured to sense whether the user approaches the mobile terminal 100 and a temperature sensor 142 configured to sense temperatures of the mobile terminal and near the mobile terminal.

The output unit 150 may generate outputs relevant to the senses of sight, hearing, touch and the like. The output unit 150 includes the display 151, an audio output module 152, an alarm unit 153, and a haptic module 154 and the like.

The display 151 may be implemented to visually display (output) information associated with the mobile terminal 100. For instance, if the mobile terminal is operating in a phone call mode, the display may provide a user interface (UI) or graphical user interface (GUI) which includes information associated with placing, conducting, and terminating a phone call. As another example, if the mobile terminal 100 is in a video call mode or a photographing mode, the display 151 may additionally or alternatively display images which are associated with these modes, the UI or the GUI.

The display 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays.

Some of the above displays can be implemented in a transparent or optical transmittable type, which can be named a transparent display. As a representative example for the transparent display, there is TOLED (transparent OLED) or the like. A rear configuration of the display 151 can be implemented in the optical transmittive type as well. In this configuration, a user is able to see an object in rear of a terminal body via the area occupied by the display 151 of the terminal body.

At least two displays 151 may be provided to the mobile terminal 100 in accordance with the implemented configuration of the mobile terminal 100. For instance, a plurality of displays can be arranged on a single face of the mobile terminal 100 in a manner of being spaced apart from each other or being built in one body. Alternatively, a plurality of displays can be arranged on different faces of the mobile terminal 100.

In case that the display 151 and the touch sensor 137 configures a mutual layer structure (hereinafter called 'touch screen'), it is able to use the display 151 as an input device as well as an output device. In this case, the touch sensor may be configured as a touch film, a touch sheet, a touchpad or the like.

The touch sensor 137 can be configured to convert a pressure applied to a specific portion of the display 151 or a variation of a capacitance generated from a specific portion of the display 151 to an electric input signal. Moreover, it is able to configure the touch sensor 137 to detect a pressure of a touch as well as a touched position or size.

If a touch input is made to the touch sensor 137, signal(s) corresponding to the touch is transferred to a touch controller. The touch controller processes the signal(s) and then transfers the processed signal(s) to the controller 180. Therefore, the controller 180 is able to know whether a prescribed portion of the display 151 is touched.

Figure 2:
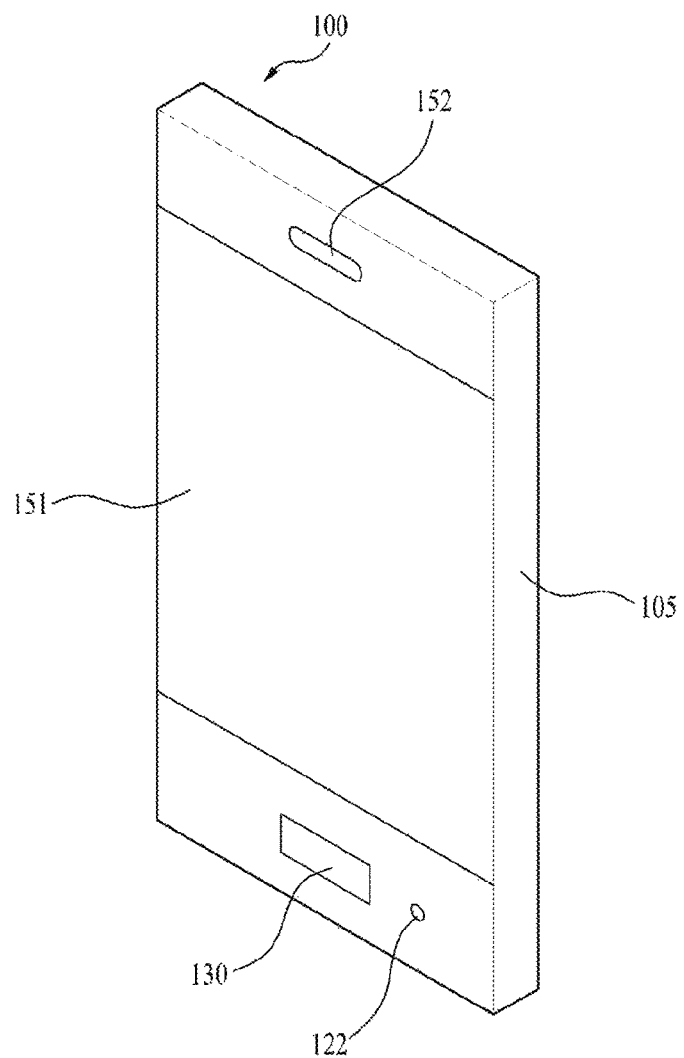
FIG. 2 is a front perspective diagram illustrating the mobile terminal according to one embodiment of the present disclosure.

Referring to FIGS. 1 and 2, a proximity sensor 141 can be provided to an internal area of the mobile terminal 100 enclosed by the touchscreen or around the touchscreen. The proximity sensor 141 is the sensor that detects a presence or non-presence of an object approaching a prescribed detecting surface or an object existing around the proximity sensor using an electromagnetic field strength or infrared ray without mechanical contact. Hence, the proximity sensor has durability longer than that of a contact type sensor and also has utility wider than that of the contact type sensor.

The proximity sensor 141 can include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor and the like. In case that the touchscreen includes the electrostatic capacity proximity sensor, it is configured to detect the proximity of a pointer using a variation of electric field according to the proximity of the pointer. In this case, the touchscreen (touch sensor) can be classified as the proximity sensor.

For clarity and convenience of the following description, as a pointer becomes proximate to a touchscreen without coming into contact with the touchscreen, if the pointer is perceived as situated over the touchscreen, such an action shall be named 'proximity touch'. If a pointer actually comes into contact with a touchscreen, such an action shall be named 'contact touch'. A proximity-touched position over the touchscreen with the pointer may mean a position at which the pointer vertically opposes the touchscreen when the touchscreen is proximity-touched with the pointer.

The proximity sensor 141 detects a proximity touch and a proximity touch pattern (e.g., a proximity touch distance, a proximity touch duration, a proximity touch position, a proximity touch shift state, etc.). In addition, information corresponding to the detected proximity touch action and the detected proximity touch pattern can be outputted to the touchscreen.

The audio output module 152 functions in various modes including a call-receiving mode, a call-placing mode, a recording mode, a voice recognition mode, a broadcast reception mode and the like to output audio data which is received from the wireless communication unit 110 or is stored in the memory 160. During operation, the audio output module 152 outputs audio relating to a particular function (e.g., call received, message received, etc.). The audio output module 152 is often implemented using one or more speakers, buzzers, other audio producing devices, and combinations thereof.

The alarm unit 153 is output a signal for announcing the occurrence of a particular event associated with the mobile terminal 100. Typical events include a call received event, a message received event and a touch input received event. The alarm unit 153 is able to output a signal for announcing the event occurrence by way of vibration as well as video or audio signal. The video or audio signal can be output via the display 151 or the audio output unit 152. Hence, the display 151 or the audio output module 152 can be regarded as a part of the alarm unit 153.

The haptic module 154 generates various tactile effects that can be sensed by a user. Vibration is a representative one of the tactile effects generated by the haptic module 154. Strength and pattern of the vibration generated by the haptic module 154 are controllable. For instance, different vibrations can be output in a manner of being synthesized together or can be output in sequence.

The haptic module 154 is able to generate various tactile effects as well as the vibration. For instance, the haptic module 154 generates the effect attributed to the arrangement of pins vertically moving against a contact skin surface, the effect attributed to the injection/suction power of air though an injection/suction hole, the effect attributed to the skim over a skin surface, the effect attributed to the contact with electrode, the effect attributed to the electrostatic force, the effect attributed to the representation of hold/cold sense using an endothermic or exothermic device and the like.

The haptic module 154 can be implemented to enable a user to sense the tactile effect through a muscle sense of finger, arm or the like as well as to transfer the tactile effect through a direct contact. Optionally, at least two haptic modules 154 can be provided to the mobile terminal 100 in accordance with the corresponding configuration type of the mobile terminal 100.

The memory 160 is generally used to store various types of data to support the processing, control, and storage requirements of the mobile terminal 100. Examples of such data include program instructions for applications operating on the mobile terminal 100, contact data, phonebook data, messages, audio, still pictures (or photo), moving pictures, etc. In addition, a recent use history or a cumulative use frequency of each data (e.g., use frequency for each phonebook, each message or each multimedia) can be stored in the memory unit 160. Moreover, data for various patterns of vibration and/or sound output in case of a touch input to the touchscreen can be stored in the memory unit 160.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, XD memory, etc.), or other similar memory or data storage device. In addition, the mobile terminal 100 is able to operate in association with a web storage for performing a storage function of the memory 160 on Internet.

The interface unit 170 is often implemented to couple the mobile terminal 100 with external devices. The interface unit 170 receives data from the external devices or is supplied with the power and then transfers the data or power to the respective elements of the mobile terminal 100 or enables data within the mobile terminal 100 to be transferred to the external devices.

The interface unit 170 may be configured using a wired/wireless headset port, an external charger port, a wired/wireless data port, a memory card port, a port for coupling to a device having an identity module, audio input/output ports, video input/output ports, an earphone port and/or the like.

The identity module is the chip for storing various kinds of information for authenticating a use authority of the mobile terminal 100 and can include User Identify Module (UIM), Subscriber Identify Module (SIM), Universal Subscriber Identity Module (USIM) and/or the like. A device having the identity module (hereinafter called 'identity device') can be manufactured as a smart card. Therefore, the identity device is connectible to the mobile terminal 100 via the corresponding port.

When the mobile terminal 100 is connected to an external cradle, the interface unit 170 becomes a passage for supplying the mobile terminal 100 with a power from the cradle or a passage for delivering various command signals input from the cradle by a user to the mobile terminal 100. Each of the various command signals input from the cradle or the power can operate as a signal enabling the mobile terminal 100 to recognize that it is correctly loaded in the cradle.

The controller 180 may control the overall operations of the mobile terminal 100. For example, the controller 180 may performs the control and processing associated with voice calls, data communications, video calls, etc. The controller 180 may include a multimedia module 181 that provides multimedia playback. The multimedia module 181 may be configured as part of the controller 180, or implemented as a separate component.

Moreover, the controller 180 is able to perform a pattern (or image) recognizing process for recognizing a writing input and a picture drawing input carried out on the touchscreen as characters or images, respectively.

The power supply unit 190 provides power required by the various components for the mobile terminal 100. The power may be internal power, external power, or combinations thereof.

A battery may include a built-in rechargeable battery and may be detachably attached to the terminal body for a charging and the like. A connecting port may be configured as one example of the interface 170 via which an external charger for supplying a power of a battery charging is electrically connected.

The actuator 200 is configured to control the mobile terminal to move positively and a shape of the mobile terminal may be changed (e.g., curved) by the actuator 200.

The body 105 of the mobile terminal has to be formed of a flexible material such that the shape of the mobile terminal may be changed by the operation of the actuator 200. A shape memory alloy or a motor may be used for the actuator 200 and detailed description about the actuator 200 will be described later.

Various embodiments described herein may be implemented in a computer-readable medium using, for example, computer software, hardware, or some combination thereof.

FIG. 2 is a front perspective diagram illustrating the mobile terminal according to one embodiment of the present disclosure. In FIG. 2 are shown the body 105, the display 151, the audio output unit 152, the user input unit 130, and the microphone 122.

The mobile terminal body 105 may have a predetermined portion which is flexible. An entire portion of the mobile terminal body 105 may be formed of a flexible material or the mobile terminal body 105 may be partially formed of a flexible material.

To realize a flexible body, a flexible plastic material (e.g., a conventional metallic or glass material) or a foldable structure may be provided in a predetermined portion of the body to allow the portion having the foldable structure to be bent.

The display 151 may occupy most of the body 105 and output image information. Recently, a touch sensor 137 may be provided in the display to realize a touchscreen which can allow input and output simultaneously. Especially, the user input unit 130 may be reduced as much as possible and the touchscreen may be provided for most of input functions.

The display 151 according to exemplary embodiments of the present disclosure may be a flexible display to be flexible in response to the shape variation of the body 105. Not a conventional glass substrate but a plastic material may be used as such a flexible display.

The audio output unit 152, the user input unit 131 and the camera 121 may be arranged in the body 105 of the mobile terminal.

Although not shown in FIG. 2, the mobile terminal according to exemplary embodiments of the present disclosure includes the actuator 200. The actuator 200 may be a device for providing a power to curve the flexible body 105 and it may be arranged in a flexible portion of the body 105.

The actuator 200 may allow the body 105 be folded or curved positively in accordance with the controller 180, while a shape of the flexible body 105 is not changed by the user passively. A bendable portion may be differentiated by the flexible portion of the body and the arrangement of the actuator 200.

For convenient explanation, the entire portion of the body 105 may be formed of a flexible material and the actuator 200 operated to curve a central portion of the body 105, which will be described as follows. Examples of the actuator 200 may include a shape memory alloy and a motor 220.

Figure 3A:
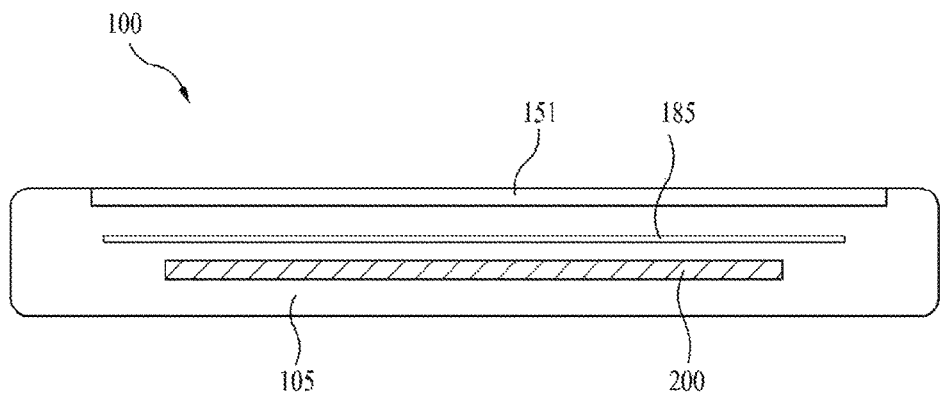
FIGS. 3a and 3b are diagrams illustrating an actuator according to one embodiment which is provided in the mobile terminal.

FIG. 3a is a diagram illustrating a cross section of a mobile terminal according to one embodiment. The mobile terminal 100 may include a body 105 having a predetermined portion formed of a flexible material, a display 151 provided in the body 105 to display a screen, and a shape memory alloy as the actuator 200 provided in the body 105 to change the shape of the body 105 by changing a shape thereof, using a selectively provided electrical signal.

The display 151 may be a flexible display which can correspond to a curved state of the body 105. Such a flexible display may be a flexible screen as it literally means, ultimately, a rolling or curved display. Such the flexible display may be provided with flexibility to be folded or unfolded.

A flexible printed circuit board 185 formed of a flexible material may be provided in the body 105. Although not shown in the drawings, a conventional printed circuit board and a flexible printed circuit board 185 may be selectively used in case the display 151 is partially flexible. In other words, the flexible printed circuit board 185 may be provided in a flexible portion and the printed circuit board may be provided in the other inflexible portion of the body 105.

The printed circuit board is a board in which copper wiring is printed thin and it may be an electronic part where various elements (e.g., a semiconductor, a condenser and a resistance) are mounted, only to connect the elements with each other. When using the printed circuit board, electric wiring can be designed efficiently and the size of electronic equipment can be reduced, with enhanced performance.

While a conventional printed circuit board is formed of a solid board having a predetermined strength, the flexible printed circuit board 185 has a flexible board like plastic and an electronic device attached to the flexible board to mount an electronic circuit, such that it may be proper to a shape-variable structure.

In this embodiment, an entire portion of the body 105 may be formed of a shape-variable flexible material and the actuator 200 may be a shape memory alloy in which a shape and a changed shape are alternatively changed in accordance with change in temperatures. The shape memory alloy can be inserted in the body 105 to change the shape of the body 105 in accordance with changing the shape thereof. When provided with an electrical signal, the shape memory alloy generates heat via internal resistance of metal and changes the shape thereof.

The shape memory alloy means one of metallic alloys which has a property of restituting to an original shape over a transition temperature after the shape is changed below a transition temperature. The transition temperature means a preset temperature of a material when a state of a material is transited.

The shape memory alloy may be fabricated to memory a curved shape. The shape memory alloy keeps a flat shape normally and the shape may be changed into a curved shape when it is heated to make the temperature reach a predetermined value or more.

Accordingly, the shape memory alloy can transit a thermal energy into a mechanical energy (e.g., displacement and force) and it has a shape memory effect, a vibration control effect and a supper elastic effect. Also, the shape memory alloy has an excellent anticorrosion.

The shape memory effect means the property that the shape changed at a low temperature (e.g., below a transition temperature) restitutes to an original shape when the material is heated. The vibration control effect comes out best in Martensite of the shape memory alloy. In Martensite, there is a dull thud when the shape memory alloy falls from a predetermined height like rubber, not a metallic sound. The super elastic effect mean the property that the shape changed in Austenite over a critical point restitutes to an original shape when an external force is removed.

Such the shape memory alloy may include Ni-based alloy, Cu-based alloy and Fe-based alloy. Also, it may be dozens of materials-based alloys (e.g., Cu—Zn—Ni, Cu—Al—Ni, Ag—Ni and Au—Cd that are combined with Zn, Al, Au, Ag and so on. It is known that the best shape memory alloy is Ni—Ti alloy.

The alloy mixed with Nickel and Titanium in the atom number ratio of 1:1 is called as "Nitinol". Nitinol has a unique property that a crystal structure is changed as a temperature is changed. An atomic structure of Nitinol is changed easily when the temperature is low and the atomic structure is rigid in a high temperature and not changed easily.

In the crystal structure of Nitinol, hundreds of crystal units having preset shapes and angles are repeatedly arranged. Inner structures of most metallic alloys are not affected by change in temperatures a lot. When heat is applied to a metallic alloy, atoms of the metallic alloy are vibrating faster and the metallic alloy can be curved or transformed by an external force applied thereto. At this time, a molecular structure of the metallic alloy is not changed.

However, the shape memory alloy has two stable crystal structures changed by change in temperatures. The change in temperatures can change one crystal structure into the other crystal structure. A crystal point at which such change of crystal structures is caused may be differentiated in accordance with elements and types of alloy metal. Nitinol may have the shape memory effect in a broad range of $-400°$ F. ($-240°$ C.)$\sim$$212°$ F. ($100°$ C.).

Atomic arrangement of Nitinol is a face-centered cube (atoms are arranged in a center of a dice-shaped solid body having 8 corners and 6 sides. When such Nitinol is cooled, the atomic arrangement is suddenly changed into a body centered cube (the atoms arranged in the sides are moved to a center of the cube, with atoms arranged in 8 corners remaining) at a preset temperature. Change in the crystal structure between the face-centered cube and the body-centered cube in accordance with change in temperatures may enable the shape memory effect.

To make the shape changed via an electric signal provided to the actuator 200, the actuator 200 configured of the shape memory alloy may be electrically connected to the controller 180 and the controller 180 may selectively provide the electrical signal to the actuator 200. When the electric signal is provided to the actuator 200, heat may be generated in the actuator 200 by electric resistance and the heat changes a temperature inside the actuator 200, only to change shape of the actuator 200.

In other words, the actuator 200 changes the electric signal into a thermal energy via electric resistance and the thermal energy changes the crystal structure of the actuator 200 to change the shape of the actuator 200.

The actuator 200 may be extended in a longitudinal direction with respect to the body 105, with a predetermined width, and it may be formed in a plate shape longitudinally formed from one end to the other end of the body 105.

The reason why the actuator 200 has such a preset width is that the actuator 200 has to have a predetermined surface area for causing the shape of the body 105 caused by changing the shape of the actuator 200. Also, the reason why the actuator 200 is extended in a longitudinal direction with respect to the body 105 is that the energy generated by changing the shape of the actuator 200 has to be used in changing the shape of the body 105, not absorbed in the body 105 as a stress in the body 105. When a predetermined force is applied to two objects formed of the same material, the relatively long one of the two is easily transformed.

The actuator 200 may be transformed into a curved shape from a flat shape when the temperature inside the actuator 200 is higher than a transition temperature. For that, the actuator 200 is configured to memorize a curvedly rounded shape and it is in a flat shape, when mounted in the body 105.

Accordingly, the actuator 200 may normally keep a flat shape and restitute to an original curved shape when a temperature inside the actuator 200 is over the transition temperature by the electric signal.

Figure 4:
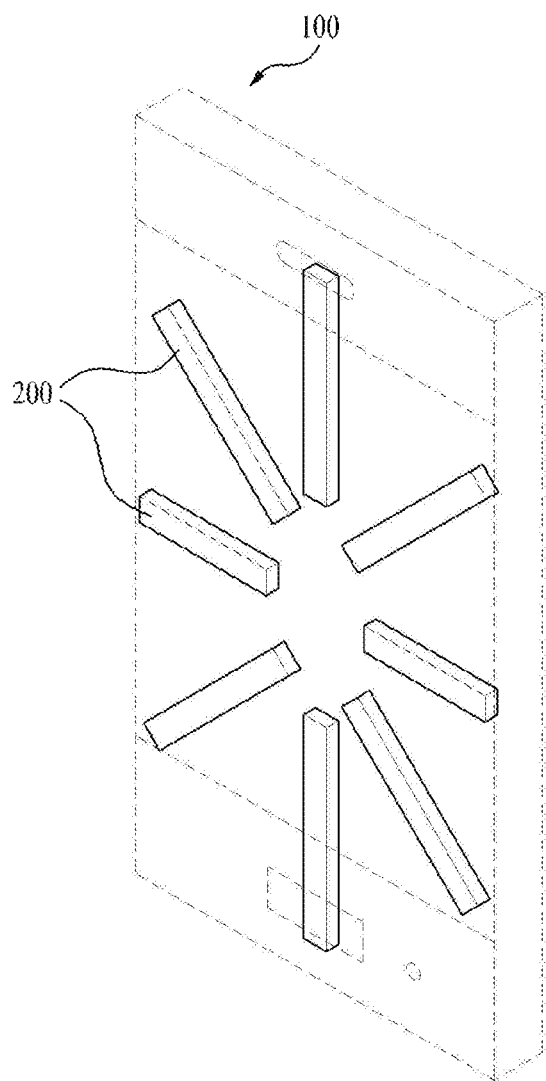
FIG. 4 is a diagram illustrating an example of arrangement of the actuator provided in the mobile terminal.

FIG. 4 illustrates an example of a position at which the actuator 200 may be arranged. As shown in the drawing, the actuator 200 may be segmented or one continuous actuator 200 may cover an entire horizontal or vertical portion.

A plurality of actuators 200 may be provided in 4 corners and centers of 4 sides in the mobile terminal 100, respectively, as shown in the drawing. If necessary, more actuators or a predetermined number of actuators may be provided.

Figure 3B:
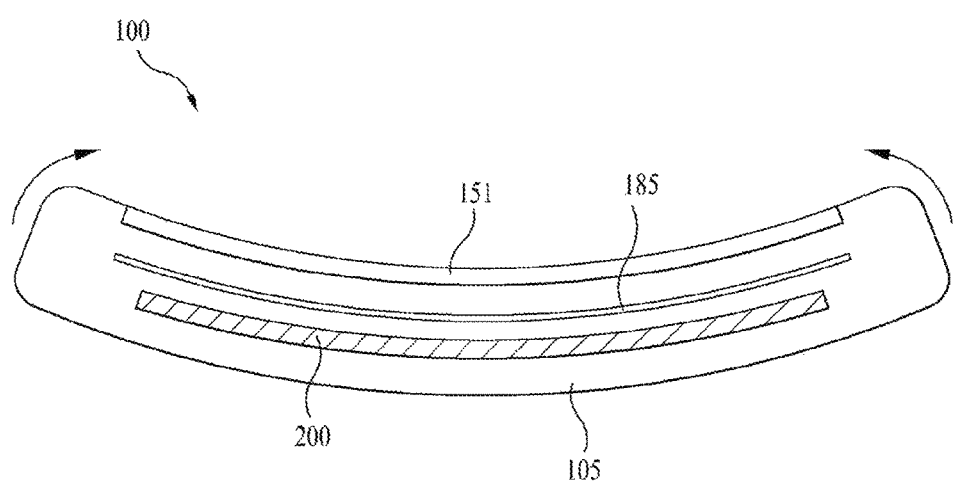
Figure 5A:
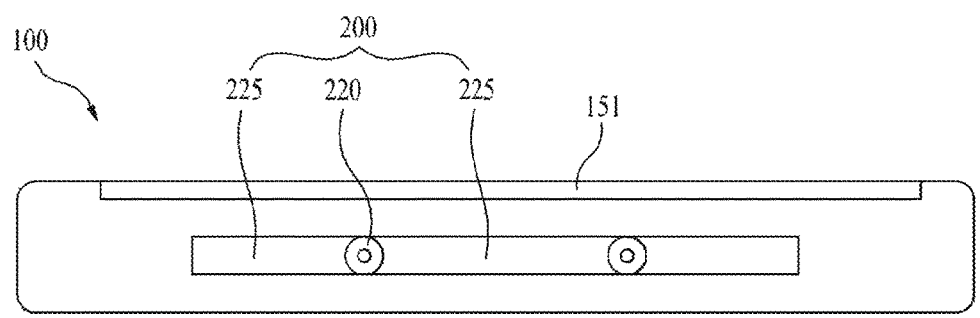
FIG. 5 is a diagram illustrating an actuator according to another embodiment which is provided in the mobile terminal.
Figure 5B:
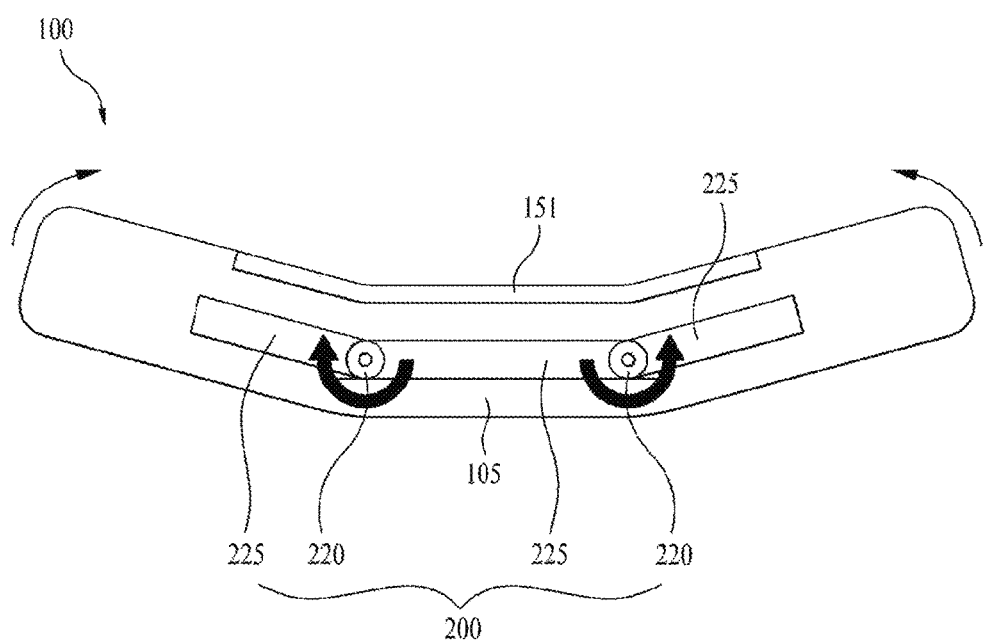

The actuator 200 may uses a motor 220 and a frame 225 as shown in FIG. 5. The entire portion of the body 105 may be formed of the flexible material as shown in the embodiment of FIG. 3b or a bent portion where the motor 220 is provided may be formed of the flexible material.

The actuator 200 may include a plurality of frames 225 connected with each other, with angles there between changed by the motor 220. The motor 220 may be driven by a signal of the controller 180 to change the angles between the frames 225. As the angles of the frames 225 are changed, the shape of the body 105 provided in the mobile terminal 100 may be changed.

In the embodiment, two motors 220 and three frames 225 are provided to make the actuator be bent in a U-shape and the embodiments of the present disclosure are not limited thereto.

The motor 220 includes a motor body configured to generate a rotational force and a shaft configured to transmit the rotational force outside. When different frames 225 are connected to the motor body and the shaft, respectively, a pair of angles of the frames may be changed as the motor body and the shaft are rotated.

As shown in FIG. 5, a pair of motors 220 are mounted to both sides of the mobile terminal 100, respectively, the vibration generated by the motors 220 may be balanced. The controller 180 applies a signal to the pair of the motors 220 and controls the motor body to rotate on the shaft. After that, the body 105 may be curved in a U-shape shown in FIG. 3b.

The shape of the actuator 200 mentioned above may be changed whenever the controller 180 applies a signal to the actuator 200. When a preset condition is satisfied, the controller 180 applies a signal to the actuator 200 to control the actuator 200 to perform a corresponding operation.

The operation of the actuator 200 is for enhancing use convenience. The actuator 200 may change the shape of the mobile terminal to prevent the user from dropping the mobile terminal 100 to reduce damage to the mobile terminal even when the user drops the mobile terminal 100, or the actuator 200 may change the shape of the body 105 of the mobile terminal to inform the user of a message.

The actuator 200 may transform the body in a preset shape easily held by the user in the hand or in a preset shape to reduce battery use or recharge the battery, when the battery is low.

When it has a large size, the mobile terminal 100 may be folded for the user to carry easily. Without the user folding or unfolding the body directly, the mobile terminal 100 may be controlled to be folded or unfolded automatically.

To implement the operation mentioned above, the user may directly input a command to the controller 180. When a preset condition is satisfied, the controller 180 may transmit a signal to the actuator 200 immediately and the shape of the body 105 may be changed, without the user directly folding or unfolding the body 105 of the mobile terminal 100.

FIGS. 6a through 11 are diagrams illustrating a screen for setting the actuator so as to change a shape of the mobile terminal, when an event is generated. In the present disclosure, the event may include operations which accompany an alarm functions for informing the user of received new data (e.g., text message receiving, call receiving, alarms, schedules and updates)

Figure 6A:
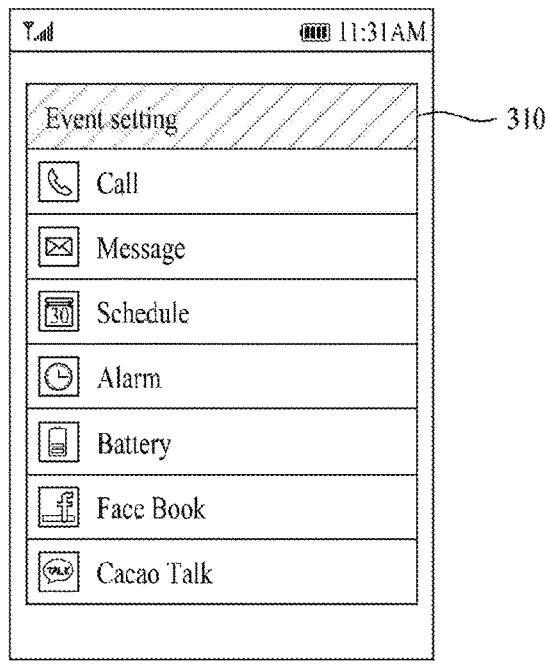
FIG. 6a through 8b are diagrams illustrating a screen for setting the actuator of the mobile terminal according to exemplary embodiments of the present disclosure.

A first graphic user interface (GUI) 310 may be provided to allow the user to select an event so as to set shape variation of the actuator corresponding to a specific event, as shown in FIG. 6a. The first graphic user interface (GUI) 310 shown in FIG. 6a may be a list or icons arranged and displayed on a screen. The user selects one of the icons and selects an event for driving the actuator 200.

When an application is selected, the same shape variation of the actuator 200 may be set for all of the events generated in the corresponding application or submenus may be further provided to set to drive the actuator 200 differently for each of specific alarm particulars. The types of the events are not limited to what is shown in FIG. 6a and the user can add an event not listed on the list.

Figure 6B:
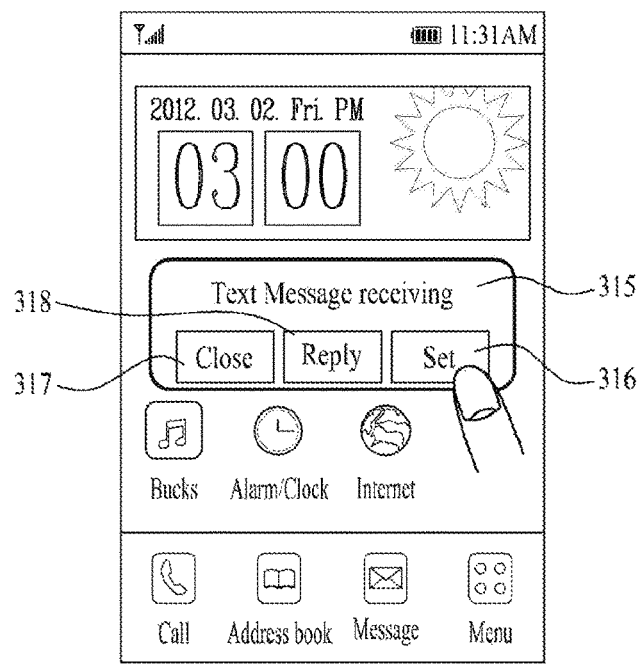

When a specific event is generated as shown in FIG. 6b, a message window 315 for asking the user whether to set shape variation of the actuator 200 may be output. The message window 315 may include buttons 317 and 318 configured to allow the user to input a command for the following work of the corresponding event, rather than a button 316 for converting a screen into a menu set screen. For example, a text message may further include a button for "Send" or a button for "Close". As another example, an alarm message may further include a button for "Confirm".

Figure 7A:
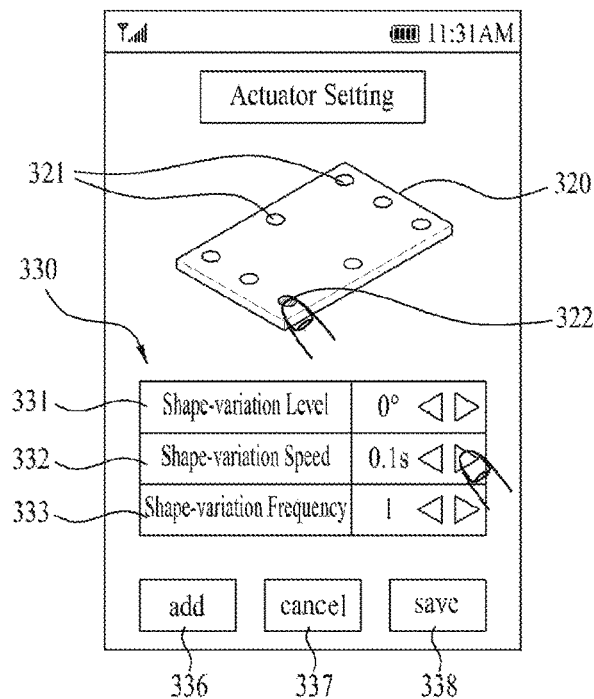
Figure 7B:
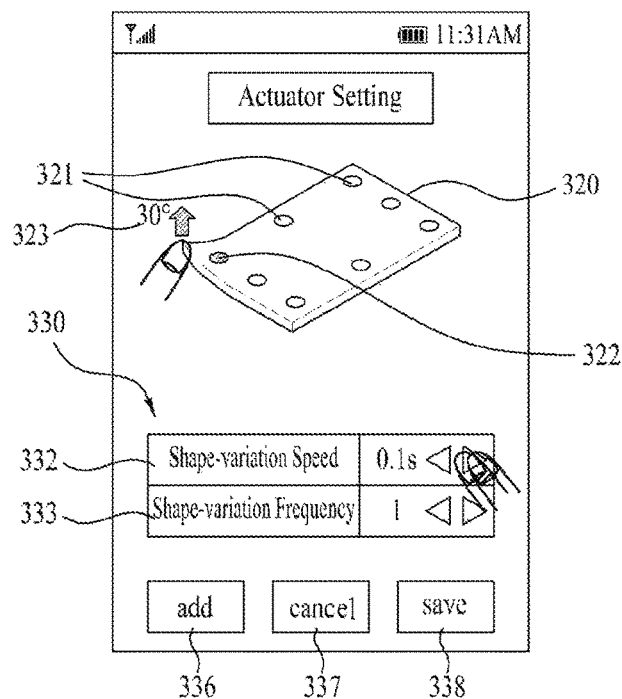

When the user presses the set button 316, there may be provided a screen for setting the shape variation of the actuator 200 linked to the corresponding event (receiving a text message in the drawing)(see FIGS. 7a and 7b).

An actuator 331 provided in the mobile terminal may be displayed on the set screen and a second user interface 320 for the user to select a driving actuator 322 desired to change the shape thereof. In FIG. 7a, the second user interface 320 according to this embodiment displays 8 actuators 321 arranged in 4 corners and centers of 4 sides in the mobile terminal, respectively. However, the number of the actuators 321 may be increased.

When the user selects the driving actuator 322, a third graphic user interface 330 may be provided to allow the user to set a shape variation level of the selected driving actuator 322. The third graphic user interface 330 may allow the user to set a shape-variation level 331 of the driving actuator 322, a speed of the shape variation 332 and a frequency of the shape variation 333 numerically.

The shape-variation level 331 adjusts angles. When angles are getting larger in a direction to (+), the driving actuator 322 is bent upward. When angles are getting smaller in a direction to (−), the driving actuator 322 is bent downward. When the shape variation level is adjusted via a third user interface 330, the second user interface 320 may display the actuator 321 bent in accordance with the adjusted value.

The shape variation speed 332 means the time taken for the actuator 200 to move in accordance with the set shape-variation level or the time taken for the actuator 200 to return to an original state after moving in accordance with the set shape-variation. When a short time is set, the actuator 200 moves quickly and when a long time is set, the actuator 200 moves slowly.

When the operation of the actuator 200 returning to the original state after transformed in accordance with the set shape-variation level is called as "a unit operation", the shape-variation frequency 333 allows the user to set the frequency of the unit operations. When the actuator 200 is operated repeatedly, the effect of informing the user of the event generation may be enhanced. The shape-variation frequency 333 can be set differently for each of the events. For example, the actuator 200 may be set to be transformed repeatedly in accordance with the number of unread messages.

As shown in FIG. 7*b*, a corner of the mobile terminal may be dragged on the second graphic user interface to set a shape-variation level for a desired shape.

At this time, an indicator 323 may be output to numerically indicate a shape-variation level in accordance with the shape-variation displayed on the second graphic user interface 320. The user may select plural driving actuators 322 transformed when one event is generated on the second user interface 320. While driving in accordance with a set shape-variation level, a set shape-variation speed and a set shape-variation frequency, the driving actuators 200 set to change the shape when each event is generated can change the shape of the mobile terminal 100.

Once the shape-variation setting for the actuator 200 is complete, the user may press a button 338 for "Save" or "Store" to store the corresponding setting or a button 337 for "Cancel" to cancel contents of the setting.

The shape-variation of the mobile terminal may be performed while the plurality of the actuators 200 are driving simultaneously or while they are driving sequentially. In the latter case, a plurality of scenes may be set and the actuators 200 are driving sequentially, only to enable the shape of the mobile terminal changed in various ways.

Figure 8A:
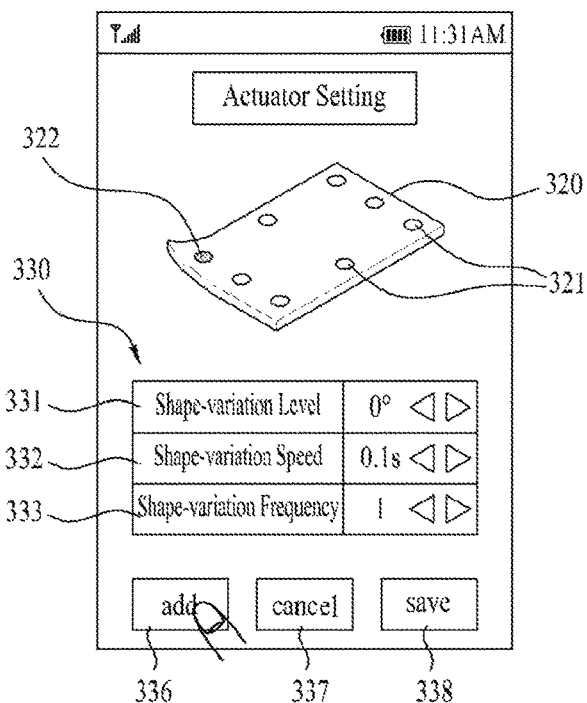
Figure 8B:
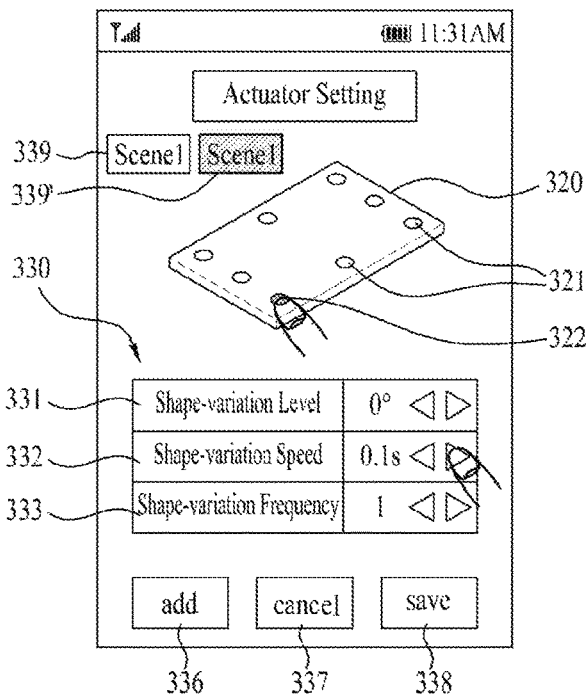

When the user selects an add button 336 shown in FIG. 8*a*, a screen shown in FIG. 8*b* may be provided to allow the user to set a second scene. Buttons 339 and 339' allowing the user to select a scene may be provided to show that the plurality of the scenes are set. The selected one 339' of the buttons may be distinguished from the other one displaying another scene.

When a specific event is generated, an operation condition of the actuator 200 corresponding to the event may be set from a setting menu by the user freely or may be set corresponding to characteristics of the event, which will be described as follows.

Figure 9:
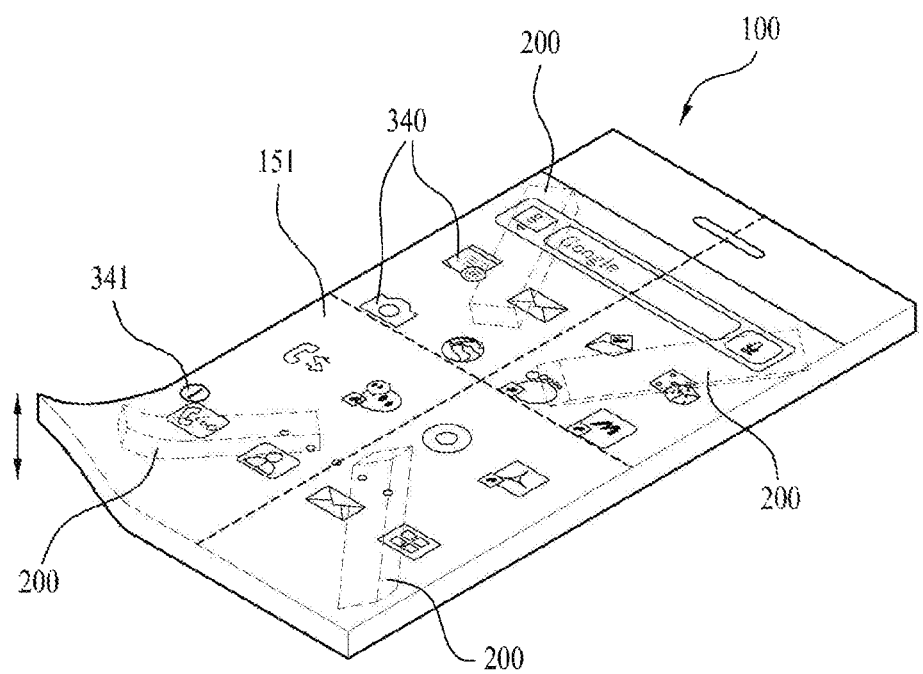
FIG. 9 is a diagram illustrating a first embodiment of shape variation of the mobile terminal.

FIG. 9 is a diagram illustrating the driving of the actuator 200 on a screen displaying a plurality of fourth user interfaces 340 to implement an application.

When an event is generated, an actuator 200 arranged nearby may be set as the driving actuator 200 on a fourth user interface 340 of an application associated with the event. In FIG. 9, the screen is divided into 4 screens in a criss-cross pattern and actuators 200 provided in 4 corners may be driven in accordance with a position of the fourth user interface 340 associated with the event.

For example, when the fourth user interface 341 configured to implement SNS application is positioned at a lower left corner, a new message is received or a new writing is updated from the SNS application and then the shape of the actuator 200 arranged at the lower left corner may be changed as shown in FIG. 9.

In this embodiment, the user sees the shape-variation of the mobile terminal and identifies that the event associated with the application of the fourth user interface 340 near the shape-changed portion of the mobile terminal 100 is generated. In the drawing, the display 151 is divided into 4 portions. However, when more actuators 200 are provided, the display 151 may be divided into more portions than 4 portions.

Figure 10A:
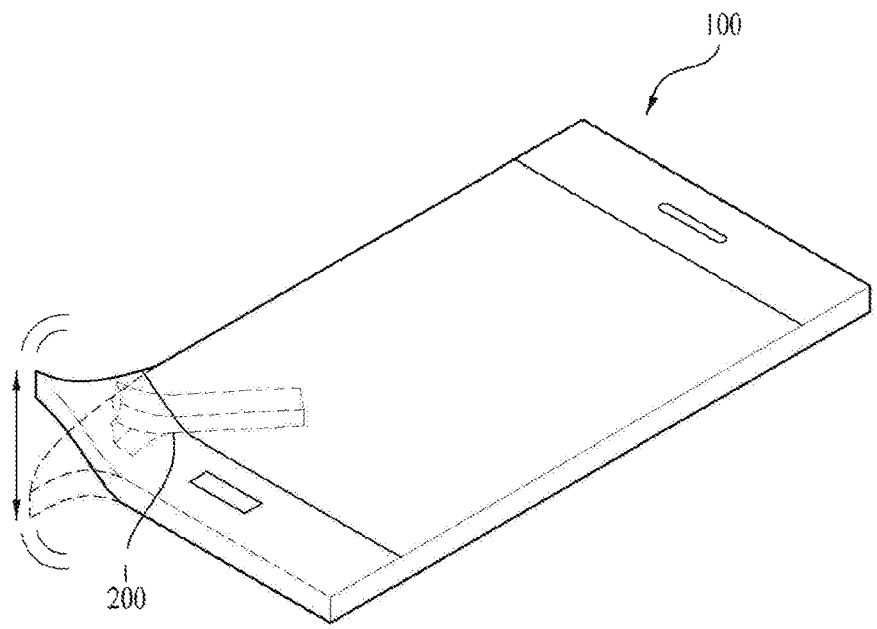
FIG. 10a is a diagram illustrating a second embodiment of shape variation of the mobile terminal.

FIG. 10*a* is a diagram of a mobile terminal according to a second embodiment of the disclosure. It is shown that the mobile terminal 100 provides vibration by changing a shape of an actuator 200 quickly several times, with no vibrator. In FIG. 10*a*, only one actuator 200 is driven and more than one actuator 200 can be transformed and cause vibration.

Figure 10B:
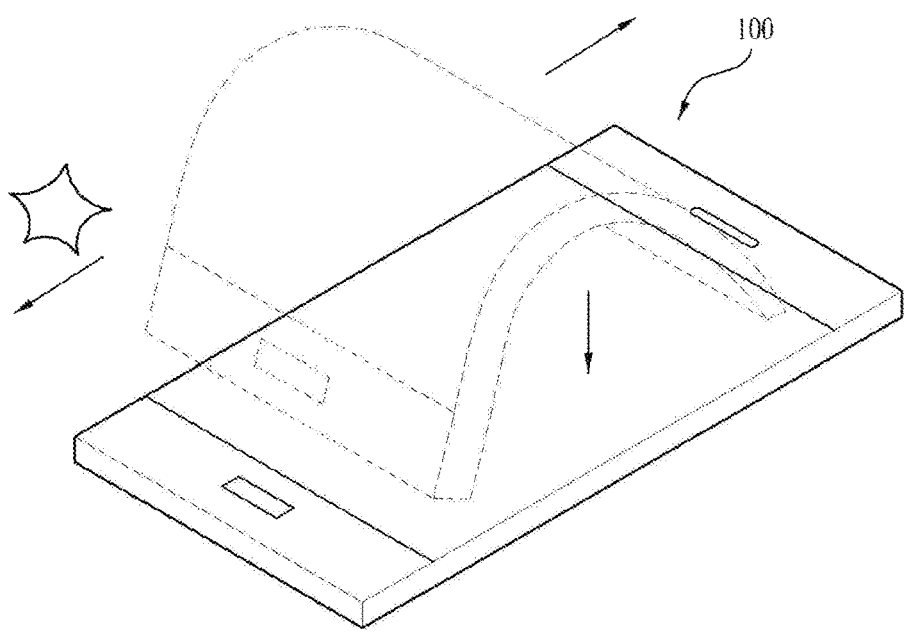
FIG. 10b is a diagram illustrating a third embodiment of shape variation of the mobile terminal.

FIG. 10*b* is a diagram of a mobile terminal according to a third embodiment of the disclosure. The mobile terminal may provide sounds by changing a shape of an actuator 200. The predetermined portion of the mobile terminal is repeatedly transformed as shown in FIG. 10*a* and sounds are generated by collision of the transformed portion with a bottom surface where the mobile terminal is standing. As shown in FIG. 10*b*, the entire portion of the mobile terminal is transformed and a shape of a predetermined portion returns to an original shape after distant from the bottom surface, such that louder sounds can be generated.

Figure 11:
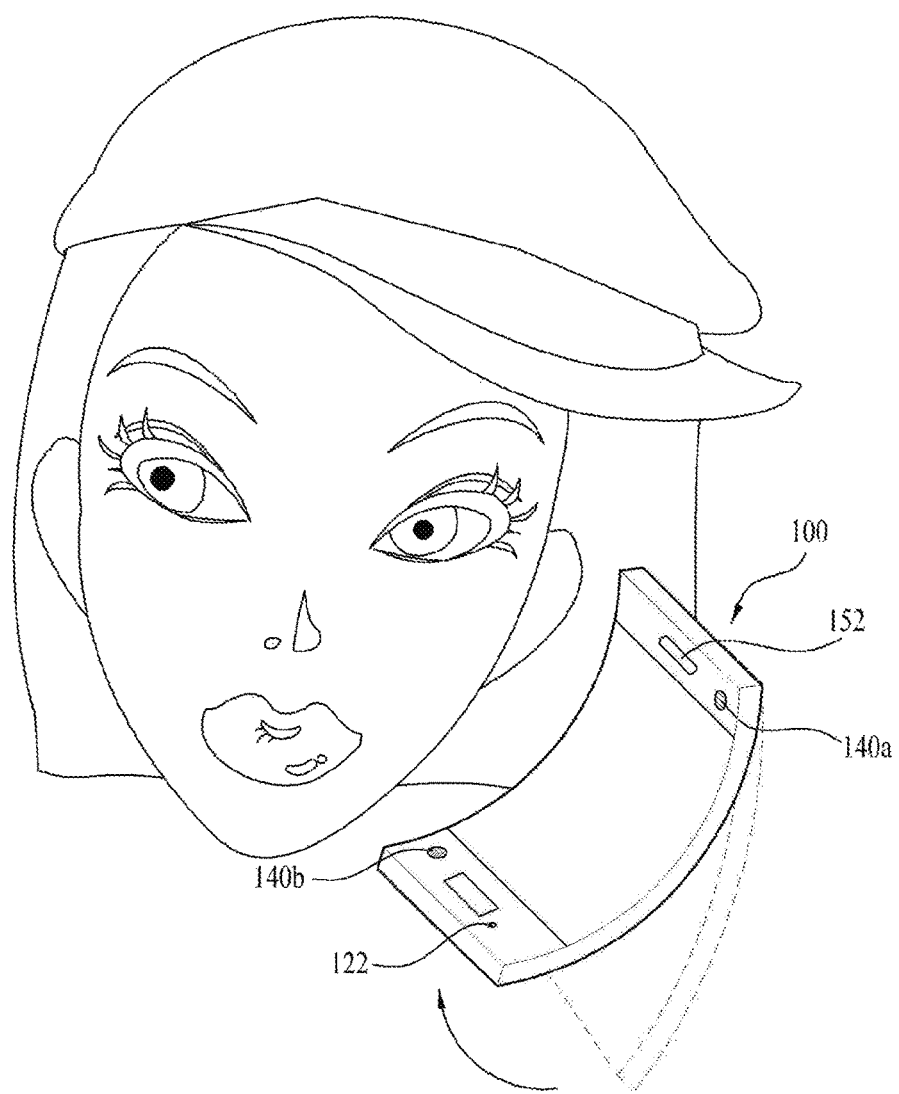
FIG. 11 is a diagram illustrating a fourth embodiment of shape variation of the mobile terminal.

Next, FIG. 11 is a diagram illustrating an example of the actuator 200 which is transformed by the controller 180 after determining that an event of the user's approaching the mobile terminal is generated once the temperature sensor 142 or the proximity sensor 141 detects change.

Once a calling application is implemented as shown in FIG. 11, the controller 180 may determine that an event for the user's approaching the mobile terminal near the face is generated and the controller may change the shape of the actuator 200. When the audio output unit 152 provided in a bar type mobile terminal is positioned near the user's ear, the microphone 122 is distant from the mouth. At this time, when the temperature sensor 142 of the mobile terminal detects that a temperature near the audio output unit 152 is relatively high and that a temperature near the microphone 122 is relatively low, it is detected that the event is generated and the controller 180 controls the actuator 200 near the microphone 122 to bend a lower end of the mobile terminal 100 forward.

Rather than the temperature sensor 142, the proximity sensor 141 may be used in detecting the event. When a distance to an object detected by the audio output unit 152 is closer than a distance to an object detected by the microphone 122, the controller 180 may determine that the event is generated.

The mobile terminal may be transformed by the driving of the actuator 200 and by the force applied by the user. The shape of the actuator 200 can be changed in accordance with the force applied to the mobile terminal.

Figure 12:
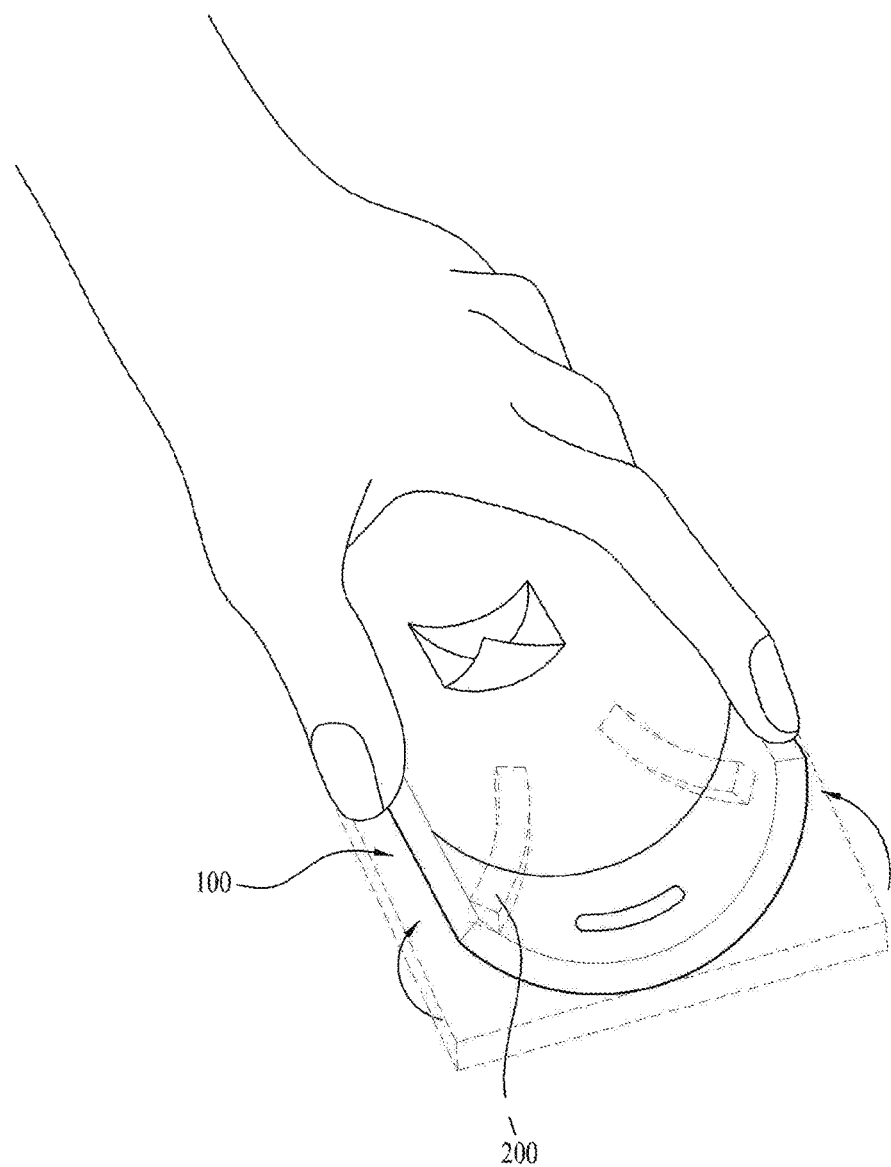
FIG. 12 is a diagram illustrating a fifth embodiment of shape variation of the mobile terminal.

While the user is picking up the mobile terminal to check an event (e.g., receiving a message), the shape of the mobile terminal may be changed as shown in FIG. 12. The changed shape of the actuator 200 may be recorded as an operation condition. When the same event is generated, the shape of the actuator 200 may be changed in accordance with the recorded condition and the shape of the mobile terminal may be changed in advance.

According to the embodiments of the present disclosure, the body of the mobile terminal includes the actuator 200 to change the shape of the mobile terminal. Accordingly, the user can be informed of a message by the shape variation of the mobile terminal, rather than conventional sounds, vibration and screen displaying, such that use convenience may be enhanced.

Furthermore, when an event is generated, the mobile terminal may memorize the changed shape of the mobile terminal. The mobile terminal can be automatically transformed in a predetermined shape which allows the user to easily hold the mobile terminal in the hand or conveniently implements a specific work. Accordingly, use convenience may be enhanced.

Still further, the user can simply set a variable shape of the actuator 200 in accordance with a use style of the mobile terminal different for each user. Accordingly, individual user control may be achieved.

Although embodiments have been described with reference to a number of illustrative embodiments thereof, it should be understood that numerous other modifications and embodiments can be devised by those skilled in the art that will fall within the spirit and scope of the principles of this disclosure.

More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

The invention claimed is:

1. A mobile terminal comprising:
    a body comprising a flexible portion;
    a flexible display provided in the body to output image information and to receive an input touch gesture;
    a plurality of actuators provided in the body and configured to change shapes of the body and the flexible display according to an adjustable operation value;
    a memory; and
    a controller configured to:
        set a shape of at least one of the plurality of actuators deformed in response to an external force to a first operation value corresponding to a first event, wherein the external force is physically applied by a user to the body in response to the first event generated at the mobile terminal in order to set desired shapes of the body and the flexible display to be associated with the first event;
        record the first operation value corresponding to the first event associated with the set desired shapes in the memory; and
        control the at least one of the plurality of actuators according to the first operation value when the first event is generated again after the first operation value is recorded in the memory such that the shapes of the body and the flexible display are changed to the set desired shapes without requiring the external force when the first event is generated again at the mobile terminal,
    wherein the first operation value comprises at least one of a driving actuator corresponding to the at least one of the plurality of actuators, a shape-variation level of the driving actuator, a shape-variation speed of the driving actuator, or a shape-variation frequency of the driving actuator.

2. The mobile terminal according to claim 1, wherein the actuators transform at least one of four corners and four sides in the mobile terminal.

3. The mobile terminal according to claim 1, wherein the controller provides a setting menu configured to set a second operation value corresponding to a second event.

4. The mobile terminal according to claim 3, wherein the controller controls the display to output a message window for entering into the setting menu or a screen of the setting menu when the second event is generated at the mobile terminal and the second operation value has not been set.

5. The mobile terminal according to claim 3, wherein the setting menu comprises a first graphic user interface configured to select the second event.

6. The mobile terminal according to claim 3, wherein the setting menu comprises a second graphic user interface representing the mobile terminal and the actuators, and
    the controller selects the driving actuator when a touch gesture is input to at least one of the actuators displayed on the second graphic user interface (GUI).

7. The mobile terminal according to claim 6, wherein the controller changes a shape of the second graphic user interface (GUI) in accordance with a length of a drag gesture, when the drag gesture is input to the driving actuator selected from the second graphic user interface (GUI), and
    the controller sets the shape-variation level of the driving actuator in accordance with a shape-variation level of the second graphic user interface (GUI).

8. The mobile terminal according to claim 3, wherein the setting menu provides a third graphic user interface configured to set at least one of an angle of the driving actuator changed with respect to the body of the mobile terminal, the shape-variation speed of the driving actuator, or the shape-variation frequency of the driving actuator numerically.

9. The mobile terminal according to claim 3, wherein the setting menu provides a third user interface configured to set a plurality of scenes implemented continuously, and
    an operation condition is set for each of the scenes.

10. The mobile terminal according to claim 1, wherein in case a shape-variation speed of the driving actuator is relatively fast and a shape-variation frequency of the driving actuator is relatively high, the controller provides sounds or vibration by controlling the at least one of the plurality of actuators in accordance with the operation value when the event is generated.

11. The mobile terminal according to claim 1, further comprising:
    a plurality of temperature sensors,
    wherein a second event is generated when temperature change is detected by at least one of the plurality of temperature sensors, and
    the controller controls an actuator placed near one of the plurality of temperature sensors which detects a temperature within a range of human temperatures when the second event is generated.

12. The mobile terminal according to claim 1, further comprising:
    a plurality of proximity sensors,
    wherein a second event is generated when an object approaching at least one of the plurality of proximity sensors is detected, and
    the controller controls at least one of the plurality of actuators to be projected toward the object or to cover the object, when the second event is generated.

13. The mobile terminal according to claim 1, wherein:
    the controller controls the display to display a plurality of user interfaces concurrently on a display screen, the plurality of user interfaces configured to implement applications, and
    the controller controls one of the plurality of actuators nearest to a user interface configured to implement one of the applications to change the shape of the body when a second event is generated at the mobile terminal, the one of the applications associated with the second event.

14. The mobile terminal according to claim 1, wherein the first event comprises at least one of message receiving, call receiving, application update, battery recharging, or sensory detection by a sensor.

15. The mobile terminal according to claim 1, wherein the first event is receiving a message such that:
  the first operation value is set with respect to the message;
  the shapes of the body and the flexible display are changed based on the first operation value when a new message is received after the first operation value is set.

16. The mobile terminal of according to claim 1, wherein the external force is applied to a portion of the body where at least one the plurality of actuators is located.

17. The mobile terminal of according to claim 1, wherein the external force is applied with at least two fingers of the user.

18. The mobile terminal according to claim 1, wherein the desired shapes of the body and the flexible display are set differently based on strength of the external force applied to the body.

19. The mobile terminal according to claim 1, wherein the external force is applied to at least one edge portion of the body.

\* \* \* \* \*